FIG.1.

Nov. 21, 1933.  O. JANSSEN  1,936,165
TRANSMISSION
Filed June 7, 1933  5 Sheets-Sheet 2

FIG.2.

Inventor,
Oscar Janssen,
Delos G. Haynes,
Attorney.

FIG.3.

Nov. 21, 1933.    O. JANSSEN    1,936,165
TRANSMISSION
Filed June 7, 1933    5 Sheets-Sheet 4

FIG.4.

Inventor
Oscar Janssen
Delos G. Haynes
Attorney.

Nov. 21, 1933.  O. JANSSEN  1,936,165
TRANSMISSION
Filed June 7, 1933   5 Sheets-Sheet 5

Inventor,
Oscar Janssen,
Delos G. Haynes
Attorney.

Patented Nov. 21, 1933

1,936,165

UNITED STATES PATENT OFFICE

1,936,165

TRANSMISSION

Oscar Janssen, St. Louis, Mo.

Application June 7, 1933. Serial No. 674,702

18 Claims. (Cl. 74—34)

This invention relates to transmissions, and with regard to certain more specific features, to a power transmission adapted to automatically adjust by infinitesimal steps the mechanical advantage between a prime mover and driving element, so that the speed-torque characteristics of the former are more advantageously than heretofore adapted to those of the latter.

This invention is an improvement upon the apparatus of the invention set forth in my United States Patent 1,933,143, dated October 31, 1933.

Among the several objects of the invention may be noted the provision of a transmission which automatically and smoothly adjusts by infinitesimal steps the mechanical advantage between a prime mover and a driven element so that during operating periods the speed-torque characteristics of the prime mover shall be automatically adapted to those of said driven element; the provision of a transmission of the class described which shall under accelerating conditions automatically and gradually, and without special manipulation, change said mechanical advantage throughout an infinite number of gradually varying, infinitesimal steps in response to the requirements of the driven member; the provision of apparatus of the class described in which maximum, unobstructed passage for working fluid is obtained; the provision of apparatus of this class in which substantially all parasitic loads except a small frictional load are eliminated, and efficiency is thus increased; and the provision of such apparatus including double acting means and a form whereby, for a given torque, only half of the amount of inertia fluid is required than was required in my said former apparatus. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Similar reference characters indicate corresponding parts throughout the several views of the drawings.

Figure 1:
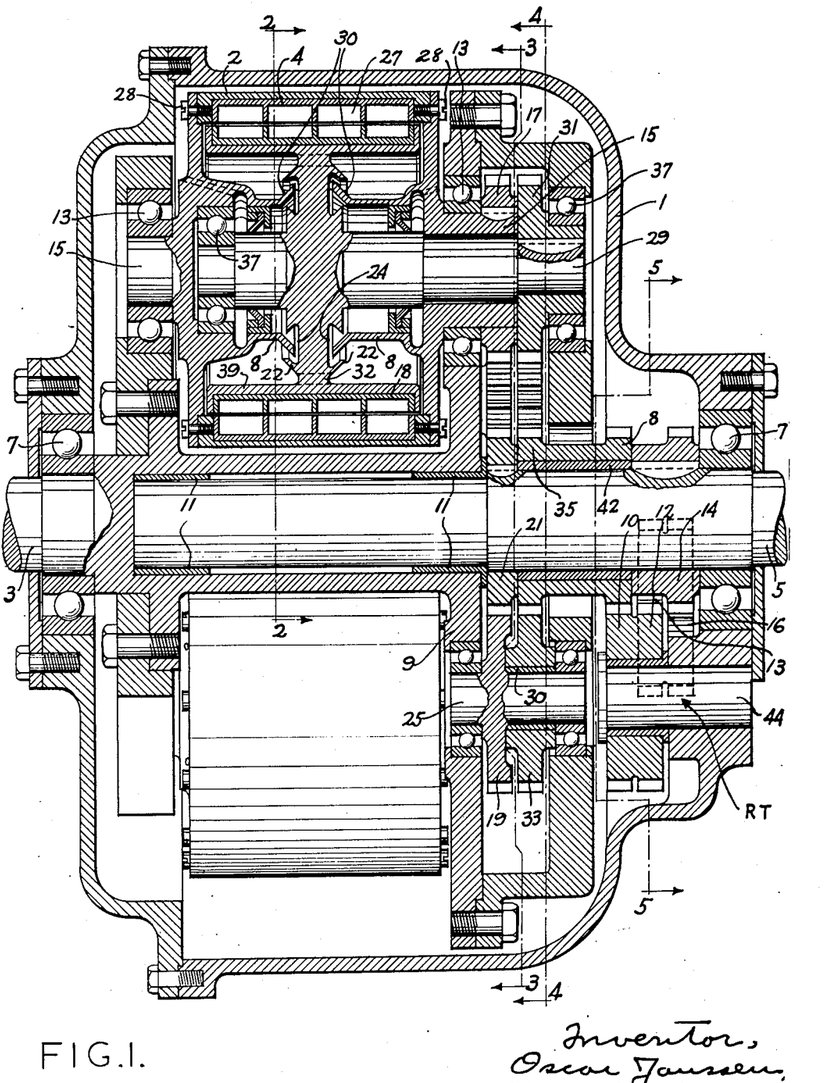
Fig. 1 is a longitudinal section of a transmission, the same being taken along line 1—1 of Fig. 3.

Referring now more particularly to Fig. 1, there is shown at numeral 1 a stationary casing adapted to be fastened to a suitable frame such as the frame of a vehicle. The reference herein to a vehicle to which the transmission is to be applied is only exemplary, and it is to be understood that other devices may be driven by means of the transmission. It is particularly effective, however, in adapting the relatively limited, effective, speed-torque ranges of internal combustion engines, turbines and the like to the relatively wide, effective, speed-torque ranges of machines such as road vehicles and others.

At numeral 3 is shown a driving member mechanically coupled to the prime mover (not shown). A driven member 5 is mechanically coupled to the element to be driven, such as the driving wheels of the vehicle (not shown). The driving members 3 and the driven member 5 both rotate with respect to the case 1 on suitable bearings 7 and with respect to one another, as will be shown.

Attached to the driving shaft 3 is a cage 9, the same being rotatable with said driving shaft 3. Said cage 9 rotates on bearings 11 and left-hand bearing 7, thereby permitting relative rotation with respect to said driven shaft 5.

Figure 3:
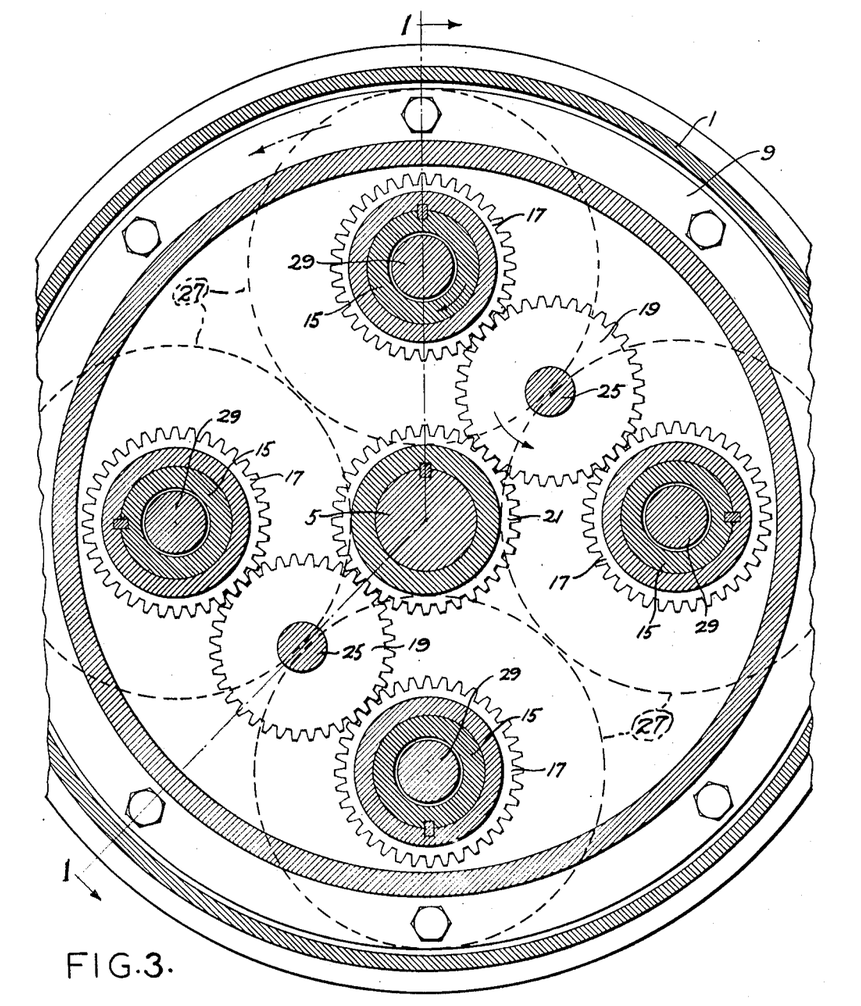
Fig. 3 is a cross section taken along line 3—3 of Fig. 1.
Figure 4:
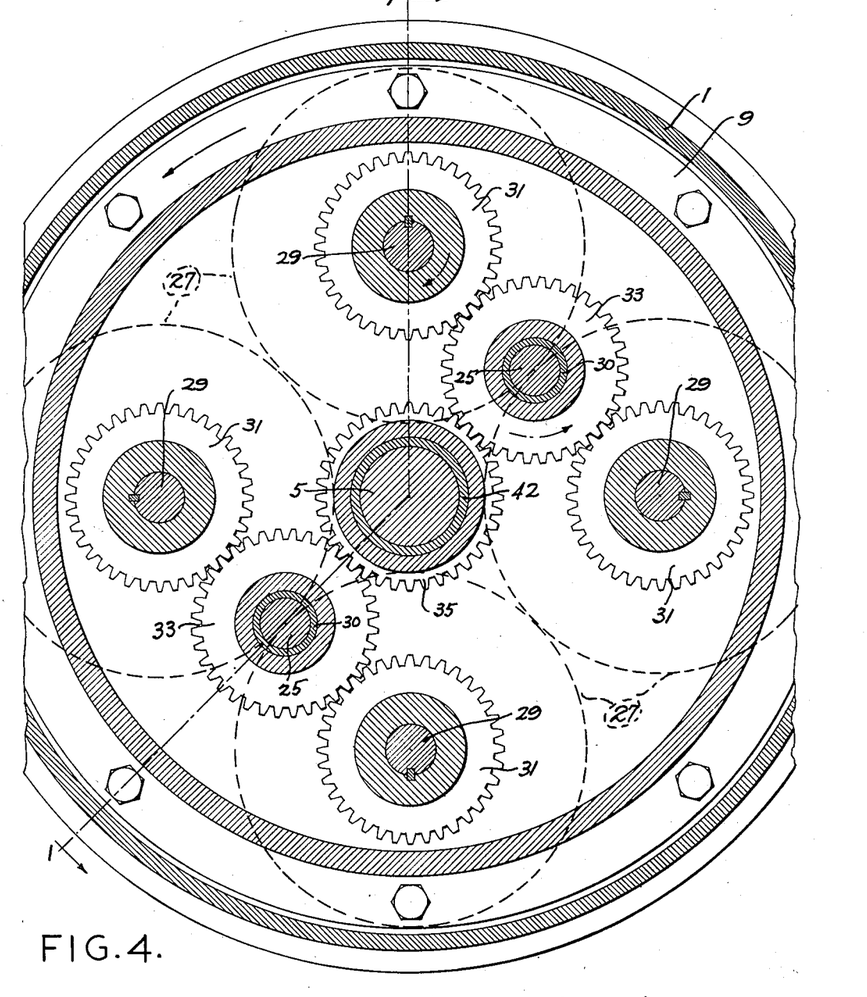
Fig. 4 is a cross section taken along line 4—4 of Fig. 1.

The cage 9 carries in bearings 13, trunnions 15, and to each right-hand trunnion (Fig. 1) is keyed an epicyclic gear 17. As will be shown four trunnioned units are used and they will be hereinafter collectively described. The gears 17 mesh with idler gears 19, said idler gears 19 being rotatably supported on said cage 9 (Fig. 3). This is accomplished on studs 25. Each idler gear 19 in turn meshes with a gear 21 keyed to the driven shaft 5.

As stated, the idler gears 19 are held to the cage 9 on the studs 25. Inasmuch as a plurality of devices supported by the trunnions 15 are desirable on the cage 9, and four is a suitable number, as above indicated, one idler 19 may be used for gearing two of the gears 17 to the central gear 21 (Fig. 3). It will be understood that any suitable number of these units may be used on the cage, including an odd number, in which case one idler should be used for each gear 17.

Each set of trunnions 15 carries a vaned or bucket wheel 27, the wheel being suitably fastened thereto, as by cap screws 28, so that upon rotation of the cage 9, each bucket wheel 27 is epicyclically turned by reason of the action of its respective epicyclic train 17, 19, revolving about gear 21 when said gear 21 is stationary, as at the start of movment; and continues to revolve on said gear 21 as long as the cage 9 tends to overrun the motion of said gear 21. Under direct drive (synchronous conditions) the epicyclic action ceases, that is, gears 17, 19 revolve about gear 21 but do not rotate upon their own axes.

Figure 2:
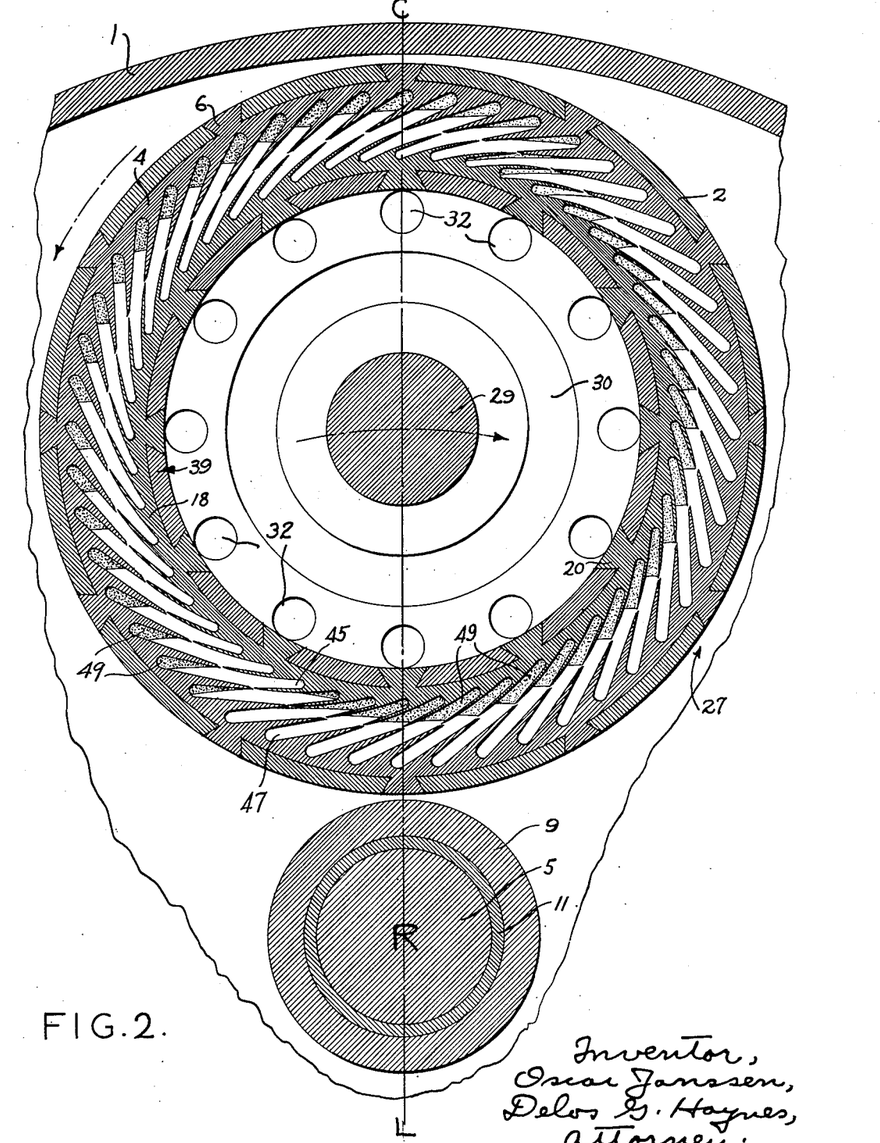
Fig. 2 is an enlarged sectional detail of certain buckets, comprising a cross-section taken on line 2—2 of Fig. 1.

Each bucket wheel 27 comprises a cylinder 2 held between the trunnion members 15 by said cap screws 28 and having preferably die-cast liners 4 dovetailed therein as indicated at 6 (Fig. 2). The particular form of the liner 4 will be discussed hereinafter, as well as the skirts 8 extending from the trunnions 15.

The cage 9 also carries an equal plurality of pairs of trunnions 29 having keyed thereto gears 31 which, by way of idlers 33, rotatable on and with respect to the cage 9, and a gear 35 are epicyclically articulated with the driven member 5 (Fig. 3).

In this respect, the present invention constitutes a change and an improvement over that set forth in said Patent 1,933,143. In that application, the gear corresponding to gear 35 was affixed to the stationary case, whereas in this disclosure it drives the driven member 5, as will be shown.

Figure 5:
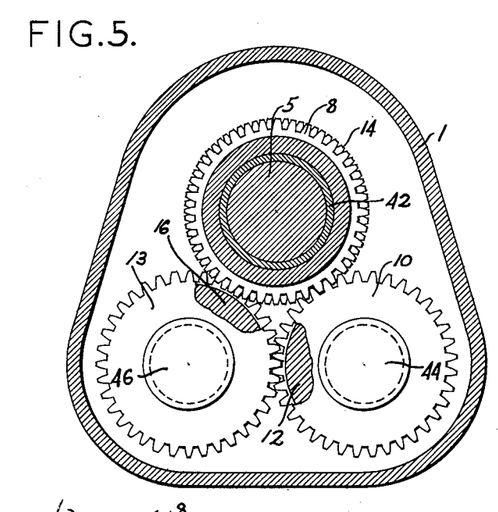
Fig. 5 is a cross section taken on line 5—5 of Fig. 1.
Figure 6:
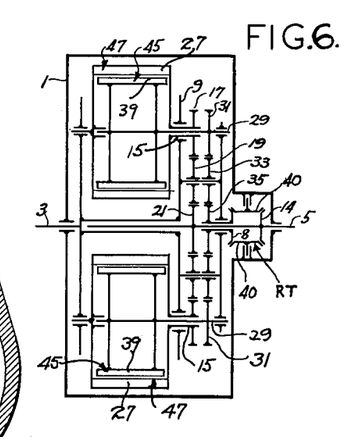
Fig. 6 is a diagrammatic layout of the parts shown in Fig. 1.

The above articulation is completed by reason of the fact that the gear 35 is one of a gear cluster freely rotatable on shaft 5, the other gear of the cluster being numbered 8. The gears 8 and 35 are integral and rotate together. The gear 8 is meshed with a gear 10 which is integral with a gear 12 (clustered), the latter meshing with a second gear 13. Gear 13 is fixedly clustered with a gear 16 which meshes with a gear 14 which is keyed to the driven member 5 (see Figs. 1 and 5). Gears 8, 10, 12, 13, 16 and 14 constitute merely a reversing train (lettered RT in general) which, for simplicity in illustration in Fig. 6 is designated by a shorter bevel train 8, 40, 14, (also lettered RT in general). Gears 8, 35 as a cluster revolve on bearing 42. Gears 10 and 12 are rotatable on pins 44 and gears 13 and 16 on pins 46.

From the above, it will be understood that the intermediate gears 19 and 33, while on the same centers, are independently rotatable, as indicated by the bearing 30 (Fig. 1). The gears 8 and 35 move together, as do also the gears 10 and 12 and 14 and 21. The fact that the gears 14 and 21 move together, both receiving impulses due to causes which will be shown and in the same direction to drive the driven member 5, instead of moving relatively while one is fixed as in the previous application, constitutes a difference and improvement in this construction over any said former construction.

Returning to the trunnions 29 (Fig. 1), it will be seen that they are held in bearings 37 within the cage 9 on the right and within the trunnion 15 on the left (Fig. 1) and pass through the right-hand set of trunnions 15. The trunnions 29 rotatably support an interior vaned or bucket wheel 39. It will thus be seen that relative rotation is permitted between the trunnions 15 with their exterior bucket wheels 27 on the one hand, and the trunnions 29 with their interior bucket wheels 39 on the other hand. The bucket wheel 39 is provided with a die-cast liner 18 corresponding to the die-cast liner 4, dove-tailed into and held in position as indicated at numeral 20 (Fig. 2).

In order to avoid packing means to prevent escape of liquids which will later be shown to be employed in the bucket wheels 27 and 39, each inner wheel 39 carries skirts 22 which are arranged to lap over the flares 30 of skirts 8 of the other bucket wheel but permitting endwise assembly and free rotation. Dove-tail grooves 24 complete a recess in the member which holds the member 22 to accommodate the skirts 8 and to provide a baffle lap over the flared ends 30 of the skirts 8. This arrangement positively prevents the escape of fluid from between the wheels, irrespective of the relative motions of the wheels or any absolute movement of the apparatus as a whole, the same being tiltable into any position while operating at any speed or while idle. Holes 32 permit passage of fluid from one side to the other of a central support 34 for the wheel 39.

Referring to Fig. 2, it will be seen that each interior bucket wheel 39 carries a series of angularly arranged and peripherally located vanes forming buckets 45. The vanes forming the bucket are directed clockwise in Fig. 3. Each bucket is formed with a mouth which is preferably equal to or wider (shown wider) than the interior recesses of the bucket, the walls between buckets being without obstruction and having smooth, streamline edges with respect to a tangential flow.

The exterior bucket wheels 27 have a corresponding series of inwardly directed vanes forming buckets 47 having a counter-clockwise direction (Fig. 3) opposite to the buckets 45. These buckets 47 likewise partake of the characteristics of the buckets 45 having mouths which are preferably at least as wide as the interior recesses of the buckets and walls between buckets which are substantially streamline with respect to a tangential flow and having relatively sharp edges.

Another feature to be noted in connection with the buckets 45 and 47 is that the latter, have a capacity for fluid which is substantially twice the capacity of the former. The reason for this, as will be enlarged upon later is to permit of all liquid being housed in the outside buckets 47 under direct drive or synchronous conditions and consequently under such conditions it is not transferred and agitated to effect a parasitic load. This constitutes the third improvement upon the disclosure of said application.

The driving connection between the power input shaft 3 and the power output shaft 5 is the liquid above referred to and consists preferably in a mass 49 of mercury or the like (including any suitable liquid or finely divided solid) activated in buckets 45 and 47. In order that this mass may be properly activated the gears 17 and 21 have equal numbers of teeth so that upon rotation of the cage 9 said gears 17, although they revolve about the gear 21 and rotate on their own axes, they do not rotate with respect to the case 1 as long as gear 21 is stationary, that is to say they rotate backwards on their own axes at the same rate that they revolve forward about shafts 3, 5. Gears 31 and 35 also preferably have equal numbers of teeth, so that they have a similar action under locked conditions of shaft 5. The size of the idlers 19 and 33 is immaterial because these gears do not affect the values of their respective gear trains but merely their respective directions of action.

The operation is as follows, assuming clockwise rotation of the cage 9 as driven by driver 3 (Fig. 2):

The idlers 19 roll upon the gear 21 which is stationary at the start, thereby driving the gears 17 on their own axes. Hence each revolution of the cage 9 is counteracted by one reverse rotation of each gear 17 on its own axis, in view of the one-to-one ratio between gears 17 and 21. Thus, the gears 17 do not rotate with respect to the frame 1, although they revolve about the axes of shafts 3, 5. The result of the above is that the bucket wheel 27 at the start also does not rotate with respect to the frame 1.

Likewise, the gears 33 in rolling on the now stationary gear 35 cause the inner buckets 45 to be non-rotatable with respect to the frame 1, although said buckets 45 revolve about the axis of shafts 3, 5. It will be understood that at this time the gear 35 is stationary, because it is in the gear train extending to the gear 14, which gear 14 is keyed to the now stationary driven shaft 5.

Centrifugal force (Fig. 2) will tend to throw the mercury outwardly. The mercury will therefore be trapped in each of the right-hand series of buckets 45 in the respective inner wheel 39 (Fig. 2) and in the left-hand series of buckets 47 in the outer wheel 27. Thus there is a clockwise torque on each bucket 47 tending to resist the counterclockwise movement imposed by the respective gear train 17, 19, 21 as the cage 9 revolves. This is due to the indrawing of the charge of mercury in said buckets 47. In this connection it may be noted that the mercury is constrained to move in a curved path away from a tangential straight line, thus setting up resistance.

It will be seen that any charge of mercury which leaves the left-hand buckets 45 of the inner wheel under centrifugal force is projected into the left-hand buckets 47 of the outer bucket wheel 39, thus tending to drive the same around in a clockwise direction against the normal direction of turning thereof which is counterclockwise (Fig. 3). That is to say, the mass of mercury, taken as a whole in buckets 47 tends to be drawn inwardly against the centrifugal force thereof or to be deviated from a straight path to a curved path.

Thus it will be seen that the free counterclockwise turning of the gear train from the outer bucket wheel 27 to the central gear 21 is resisted and there is consequently a tendency for said train to become locked, said tendency being in proportion to the square of the angular velocity of the driving of the cage 9. Thus the force applied to the gear 21 is according to the square of the angular velocity of the driving shaft 3.

Finally, a condition is reached wherein the torque due to locking overcomes the resisting torque and the gear 21 accelerates until a condition of torque balance is reached with the gear in motion.

Referring again to Fig. 2, it will be seen that as motion continues, the mass of mercury which was trapped in the buckets 47 becomes positioned nearer to the center of rotation R of cage 9 and finally reaches a point where, after crossing line CL, it is thrown from said buckets into the buckets 45.

The mercury is transferred from buckets 47 to buckets 45 somewhat before the radial center line of the buckets is reached, due to the tangential conformation of the vanes forming the buckets.

As the mercury flows from the buckets 47 into the buckets 45, it again assumes a radial direction of movement under centrifugal force and due, to the conformation of buckets 45, tends to rotate the inner bucket wheel 39 in a counter-clockwise direction, which counter-clockwise direction is the one normally assumed by said inner bucket wheel 39 due to the epicyclic action of the gears 31 and 33, to 35. Inasmuch as the centrifugal force of the mercury in the buckets 45 is aiding said buckets 45 in turning them in the direction of motion which they normally assume, said bucket wheels 39 are forced by the centrifugal force of the mercury to drive the following gear trains: 31, 33, 35, 8, 10, 12, 13, 16, 14. The train tends to drive the shaft 5 to which the gear 14 is keyed in the same direction that the gear 21 tends to drive said shaft. The impelling torque at gear 14 is delivered in the same direction as the impelling torque at gear 21.

From the above, it will be seen that both inner and outer bucket wheels 39 and 27 effect a drive upon the driven shaft 5 due to the action of the mercury, instead of having one wheel affect driving and the other a reaction against the case 1 as was the fact in my said former construction. The advantage of this lies in the fact that under non-locked output condition, that is, when the driven shaft 5 moves, gradually more mercury is retained in the outer buckets 47 and less in the inner buckets 45. This is due to said non-rotation on their own axes of the bucket wheels as synchronism is approached.

Finally, under direct-drive or synchronous condition, all of the mercury is in the outer buckets 47 and none is in the inner buckets 45 with the consequence that all of the driving is by way of the gear train 17, 19, 21. In my said prior structure, the outer buckets had capacity for only less than all of the mercury; therefore, the remainder was churned by the inner buckets under synchonous conditions and maximum capacity could not be obtained from the machine under direct-drive conditions as is the case in the present machine. In the present machine, when the mercury is in the outside buckets, under substantially synchronous conditions, it is substantially quiescent.

With the present construction, at the start one-half of the energy flows through the trains 17, 19, 21 and one-half through trains 31, 33, 35, 8, 10, 16, 12, and 14. Under starting conditions and as acceleration of the driven member 5 is effected, more and more of the energy feed is dropped by the latter train and assumed by the former, until the former feeds all of the energy to the driven shaft 5. Provision having been made for the outer buckets 47 containing all of the mercury and for them to assume all of the driving function results in increased operating efficiency, and this constitutes another of the advantages herein.

The inner buckets 45 are so proportioned that the active portions of these buckets will be full of mercury when the mechanism is in a locked output condition, thus making the torque even.

Figure 7:
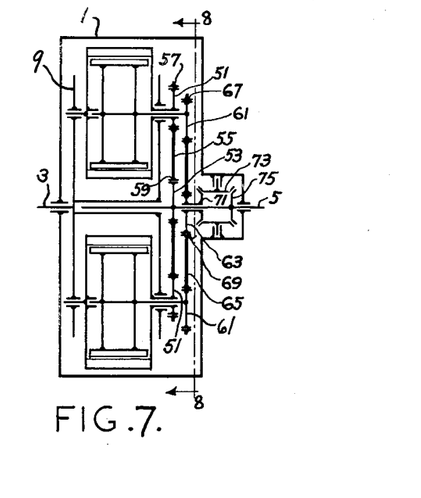
Fig. 7 is a diagrammatic view similar to Fig. 6 showing a modification.
Figure 8:
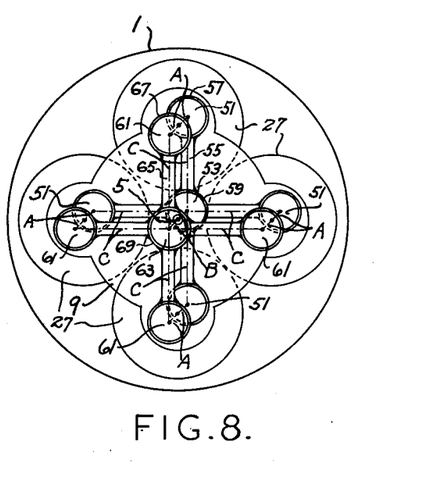
Fig. 8 is a view taken on line 8—8 of Fig. 7.

In Figs. 7 and 8 is shown an alternative linkage for carrying out the principles above set forth. Like numerals designate like parts. The difference consists in substituting for the epicyclic trains above set out, certain bar linkages which accomplish the same motions of mercury.

Specifically, there is substituted for the gears 17 eccentrics 51 and for the gear 21, an eccentric 53 affixed to the driven shaft, and, instead of the idler gears 19, there are substituted the connecting arms 55 having eccentric straps 57 and 59 which encircle said eccentrics 51 and 53, respectively. The four eccentrics 51 and 53, with the arms 55 constitute a rigid member of cruciform shape (Fig. 8).

On the other hand, for the gears 31 are substituted eccentrics 61 and for the gear 35 is substituted an eccentric 63 rotatable on the driven shaft 5. Connecting arms 65 having four straps 67 and strap 69 joins the said eccentrics (see Fig. 8). In Fig. 8 it will be seen that one central eccentric strap serves four connecting arms and four outer eccentrics, each assembly forming a cruciform member.

Each of the cruciform members constitutes a connection between the respective central eccentric and the outer eccentrics and imparts the same motion to the bucket wheels as said gear trains, and thus the actions above described correspond. When the driven member 5 is locked, the centrifugal action of the mercury inhibits free articulation of the linkages, the inhibition being proportional to the square of the angular velocity of the cage supporting the mercury bucket wheel, and as this occurs, the linkages stiffen, instead of freely articulating, and effect driving action.

The eccentric 63 is geared to the driven shaft 5 by means of a reversing gear train 71 (Fig. 7), consisting of a bevel gear 71, a bevel pinion 73 and a bevel gear 75 on the shaft 5.

To clarify the construction of Figs. 7 and 8, each pair of eccentrics and their respective arm have been represented by their kinematically equivalent, parallel-bar linkage shown by dotted lines in Fig. 8. The short dotted lines A represent the cranks on the bucket wheels which are equivalent to the eccentrics, the short dotted lines B represent the equivalent cranks on shaft 5 and the connecting dotted lines C represent the equivalent connecting rods which join the equivalent cranks. The cyclic positions of the resulting equivalent parallogram linkages show that the bucket wheels 27, 39 do not turn with respect to the frame, their backward rotation equaling their forward revolution under locked output conditions. The assumption of said positions under driving conditions is resisted by the action of the mercury, thus causing the buckets to stiffen the otherwise freely articulating linkage and thus to effect driving.

The construction in all of its forms may be epitomized as follows:

A power transmission is effected comprising a driving member 3, a driven member 5, said members being relatively rotatable within the fixed member 1. Between these driving and driven members is articulated means, comprising the two epicyclic gear trains (Figs. 1-6), or the parallelogram linkages (Figs. 7-8), with their respective bucket wheels for controlling a free mass such as the mercury. This control is such as to constrain said free mass to move inwardly in a curved path; whereas otherwise, it would move radially and tangentially due to the centrifugal force. The action of the outer bucket wheel 27 in drawing in the mass during one part of the cycle of operation is resisted by the centrifugal force of said mass so that an action is effected on the driven member, basically due to the resisting action to the otherwise freely rotating output gear trains of the first embodiment (Figs. 1-6), or the resistance to the free articulation of the parallelogram linkages of the second embodiment (Figs. 7-9).

After a given mass of the mercury has been released, as when the buckets 47 come to the innermost point of travel with respect to the shafts 3 and 5, then the mass of mercury is released into the buckets 45.

During the remainder of the cycling movement of the mercury, the centrifugal force is applied tending to turn the buckets 45 in a counterclockwise direction. During the last-named movement, the centrifugal force also sets up an action on the driven means through gears 8, 10, 12 in Figs. 1-6, and through gears 71, 73, 75 in Figs. 6-9.

The centrifugal action, through effective lever arms and centers therefor constituted by the train of mechanism connected to output shaft 5 and which constrains the mercury in a curved path exerts a turning moment on the output member 5.

In respect to a given mass of mercury the action is sequential but referring to the aggregate action of the number of masses, the action is substantially continuous.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A power transmission comprising a stationary frame, a driving member, a driven member, a cage driven by said driving member, a plurality of movable associated means mounted on the cage and each drivably connected with said driven member, a mass associated with said means, said means being controlled by said associated means and by centrifugal force induced by rotation of said cage, one portion of said associated means forcing said mass against said centrifugal force to tend to lock its respective driving connection and cause a driving action on the driven member, and the other portion of said associated means being operated upon by said mass as it proceeds under action of centrifugal force to effect its driving of said driven means through its respective driving connection.

2. A power transmission comprising a stationary frame, a driving member, a driven member, a cage driven by said driving member, a plurality of movable associated means mounted on the cage and each drivably connected with said driven member, a mass associated with said means, said mass being controlled by said associated means and by centrifugal force induced by rotation on said cage, one portion of said associated means forcing said mass against said centrifugal force to tend to lock its respective driving connection and cause a driving action on the driven member, and the other portion of said associated means being operated upon by said mass as it proceeds under action of centrifugal force to aid in driving said driven means through its respective mechanical connection, the connections between the said associated means being such that under locked conditions of the driven member, said mass is distributed between the said associated means and under substantially synchronous conditions, said mass is all located in one of said associated means.

3. A power transmission comprising a stationary frame, a driving member, a driven member, a cage driven by said driving member, a plurality of movable associated means mounted on the cage and each drivably connected with said driven member, a mass associated with said means, said mass being controlled by said associated means and by centrifugal force induced by rotation on said cage, one portion of said associated means forcing said mass against said centrifugal force to tend to lock its respective driving connection and cause a driving action on the driven member, and the other portion of said associated means being operated upon by said mass as it proceeds under action of centrifugal force to aid in driving said driven means through its respective driving connection, the connections between the said associated means being such that under locked conditions of the driven member, said mass is distributed between the said associated means and under substantially synchronous conditions, said mass is all located in one of said associated means, and the carrying capacity of said last-named means being such as to accommodate substantially all of the mass under said substantially synchronous conditions.

4. A power transmission comprising a stationary frame, a driving member, a driven member, a cage driven by said driving member, a plurality of movable associated means mounted on the cage at least one of which is drivably connected with said driven member, a mass controlled by said associated means and by centrifugal force induced by rotation of said cage, one portion of said associated means forcing said mass against centrifugal force to tend to lock its respective driving connection and cause a driving action on the driven member, and the other portion of said associated means being operated upon by said mass as it proceeds under action of centrifugal force, said inwardly forcing portion having a capacity for all of the said mass under substantially synchronous driving conditions.

5. A power transmission comprising a stationary frame, a driving member, a driven member, a cage driven by said driving member, a plurality of movable associated means mounted on the cage and independently drivably connected with said driven member, a mass controlled by said associated means and by centrifugal force induced by rotation on said cage, one portion of said associated means forcing said mass against said centrifugal force to tend to lock its respective driving connection and to cause a driving action on the driven member, and the other portion of said associated means being operated upon by said mass as it proceeds under action of centrifugal force so as to aid in driving said driven means, the driving connections between the said respective means being such that under locked conditions of the driven member, said mass is distributed between the said associated means, and under substantially synchronous conditions said mass is substantially all located in one of said associated means, said last-named means having a capacity for all of the mass and the driving connection between said means and the driven member then transmitting all of the driving energy.

6. A power transmission comprising a stationary frame, a driving member, a driven member, a cage driven by said driving member, a plurality of movable associated means mounted on the cage and independently drivably connected with said driven member, a mass controlled by said associated means and by centrifugal force induced by rotation on said cage, one portion of said associated means forcing said mass against said centrifugal force to tend to lock its respective driving connection and cause a driving action on the driven member, and the other portion of said associated means being operated upon by said mass as it proceeds under action of centrifugal force to aid in driving said driven means, the connections between the said respective means being such that under locked conditions of the driven member, said mass is distributed between the said associated means and under substantially synchronous conditions is all located in one of said associated means, the capacity of the last-named means for said mass being substantially twice that of the other associated means.

7. A power transmission comprising a stationary frame, a driving member, a driven member, a cage driven by said driving member, a plurality of movable associated means mounted on the cage and independently linked with said driven member by means of parallel bar linkages, a mass controlled by said associated means and by centrifugal force induced by rotation on said cage, one portion of said associated means forcing said mass against said centrifugal force to tend to lock its respective linkage and cause a driving action on the driven member, and the other portion of said associated means being operated upon by said mass as it proceeds under action of centrifugal force so as to aid in driving said driven means through the respective linkage.

8. A power transmission comprising a stationary frame, a driving member, a driven member, a cage driven by said driving member, a plurality of movable associated means mounted on the cage and independently linked by bar linkages with said driven member, a mass controlled by said associated means, and by centrifugal force induced by rotation on said cage, one portion of said associated means forcing said mass against said centrifugal force to tend to lock its respective linkage and cause a driving action on the driven member, and the other portion of said associated means being operated upon by said mass as it proceeds under action of centrifugal force so as to aid in driving said driven means.

9. In transmission apparatus of the class described, an outer bucket wheel, an adjacently located inner bucket wheel, said wheels having vanes arranged to provide buckets in the wheels and a mass adapted to be controlled by the buckets, the volumes of the buckets in the outer wheel being great enough to contain the part of the mass normally controlled by said outer buckets and also the part of the mass normally controlled by the buckets in the inner wheel.

10. In transmission apparatus of the class described, associated and adjacently located bucket wheels, one of said wheels being inside the other, a liquid mass adapted to be controlled by said wheel and by centrifugal force operating thereon, the volume of the liquid mass, the volumetric capacity of the inner wheel and the volumetric capacity of the outer wheel being relatively so proportioned that the active portions of the buckets of the inner wheel will be full of the mass when the transmission is driving under locked output conditions and that the buckets of the outer wheel contain liquid at this time and substantially all of the liquid under substantially synchronous conditions.

11. A transmission comprising a frame, a driving member, a driven member, a mass revolving under centrifugal force, a case driven by the driving member, containers supported on said case, means articulating each container with the driven member, one of the containers being outside of the other and both of them being provided with adjacently located recesses to accommodate the mass, on the one hand to direct the same against centrifugal force and on the other hand to receive the force thereof upon return movement by centrifugal force, the recesses of the inner container being so proportioned that the active portions thereof will be substantially full when the mechanism is in a locked output condition, and under substantially synchronous operating condition delivering substantially all of its mass to the other container.

12. A transmission comprising a frame, a driving member, a driven member, a mass revolving under centrifugal force, a cage driven by the driving member, containers supported on said case, means articulating each container with the driven member, one of the containers being outside of the other and both of them being provided with adjacently located recesses, one to accommodate the mass to direct the same against centrifugal force, and the other to accommodate the mass to receive the force thereof upon movement by centrifugal force, the recesses of the inner container being so proportioned that the active portions thereof will be substantially full of the mass when the mechanism is in a locked output condition and the recesses of the outer member being large enough to contain substantially all of the mass.

13. A transmission comprising a frame, a driving member, a driven member, a mass revolving under centrifugal force, a cage driven by the driven member, containers supported on said case, means articulating both containers with the driven member, one of the containers being outside of the other and being provided with adjacently located recesses to accommodate the mass to direct the same against centrifugal force and to receive the force thereof upon movement by centrifugal force, the recesses of the container being so proportioned that the active portions thereof will be substantially full of the mass when the mechanism is in a locked output condition and the recesses of the outer member containing approximately one-half of the mass under locked output condition and having a volume adapted to receive substantially all of the mass under substantially synchronous operating conditions.

14. In transmission apparatus of the class described, fluid-containing bucket wheels having adjacently located buckets, one wheel being supported within the other, a radial support for the inner wheel, at least one radial support for the outer wheel spaced from the radial support for the inner wheel, at least one dovetail groove in the inner support and at least one skirt reaching from the outer supports into said groove.

15. In transmission apparatus of the class described, fluid-containing bucket wheels having adjacently located buckets, one wheel being supported within the other, a radial support for the inner wheel, a radial support for the outer wheel spaced from the radial support for the inner wheel, a dovetail groove in the inner support and a skirt reaching from the outer supports into said groove, said skirt being arranged so that one edge portion of said groove laps the skirt at an angle.

16. In transmission apparatus of the class described, fluid-containing bucket wheels having adjacently located buckets, one wheel being supported within the other, a radial support for the inner wheel, a radial support for the outer wheel spaced from the radial support for the inner wheel, a dovetail groove in the inner support and a skirt reaching from the outer supports into said groove, said skirt having a conical end, one edge portion of said groove conically lapping the skirt.

17. In transmission apparatus of the class described, fluid-containing bucket wheels having adjacently located buckets, one wheel being supported within the other, a radial support for the inner wheel, a radial support for the outer wheel spaced from the radial support for the inner wheel, a dovetail groove in the inner support and a skirt having a conical end reaching from the outer support into said groove, the outer edge portion of said groove shingle lapping the conical end of the skirt and the other edge portion of the groove functioning as a trough with respect to any material passing through the said shingle lapping, and passages joining opposite sides of said central supporting means.

18. A power transmission comprising a driving member, a driven member, outer and inner associated bucket wheels revolved by the driving member and epicyclically articulated with the driven member, oppositely disposed pockets forming the buckets of said bucket wheels, said pockets being moved by the epicyclic action inwardly and outwardly with respect to the center of revolution and moving in closed paths, said pockets being so shaped in cross section that tangents to said paths drawn across the openings of the pockets leave the maximum portion of the cross-section area of each pocket outside of the said figure during a greater portion of the inward movement of the outer pockets and of the outward movement of the inner pockets, said pockets having openings covering substantially more than half of the surface of the bucket wheel in which they are, the partitions between pockets being of minimum mechanical thickness at the mouths of the openings thereof.

OSCAR JANSSEN.